United States Patent
Kim et al.

(10) Patent No.: US 9,083,104 B2
(45) Date of Patent: Jul. 14, 2015

(54) MOBILE TERMINAL

(71) Applicant: LG Electronics Inc., Seoul (KR)

(72) Inventors: Wansub Kim, Guri (KR); Myungsun Kim, Seoul (KR); Dongguk Kang, Seoul (KR); Sukho Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 200 days.

(21) Appl. No.: 13/846,710

(22) Filed: Mar. 18, 2013

(65) Prior Publication Data

US 2013/0303007 A1    Nov. 14, 2013

(30) Foreign Application Priority Data

May 14, 2012 (KR) .................. 10-2012-0051124

(51) Int. Cl.
  *H01R 13/44* (2006.01)
  *H01R 13/447* (2006.01)
  *H04M 1/02* (2006.01)
  *H01R 13/453* (2006.01)

(52) U.S. Cl.
  CPC .............. *H01R 13/447* (2013.01); *H01R 13/44* (2013.01); *H01R 13/4534* (2013.01); *H04M 1/0274* (2013.01)

(58) Field of Classification Search
  USPC ......................................... 439/137, 135, 136
  See application file for complete search history.

(56) References Cited

U.S. PATENT DOCUMENTS

| 6,652,297 | B1 * | 11/2003 | Zhang et al. ................... 439/136 |
| 7,837,484 | B2 * | 11/2010 | Wu ................................ 439/136 |
| 2007/0293068 | A1 | 12/2007 | Chang et al. |
| 2009/0280664 | A1 * | 11/2009 | Francis et al. ................ 439/136 |
| 2010/0210125 | A1 | 8/2010 | Wu |
| 2011/0157791 | A1 * | 6/2011 | Park et al. ................ 361/679.01 |

FOREIGN PATENT DOCUMENTS

KR    10-2007-0120227 A    12/2007

* cited by examiner

*Primary Examiner* — Abdullah Riyami
*Assistant Examiner* — Harshad Patel
(74) *Attorney, Agent, or Firm* — Birch, Stewart, Kolasch & Birch, LLP

(57) ABSTRACT

A mobile terminal is provided. The mobile terminal includes a terminal body having a case that forms an exterior of the terminal body and a slot portion formed in the case, a socket mounted in the terminal body, the socket being configured to receive an external device through the slot portion, a slide door arranged behind the slot portion, the slide door being configured to slide to expose and cover the socket and a first spring coupled to one side of the slide door. When the external device is connected to the socket, the external device maintains the slide door in an open position and, when the external device is removed from the socket, the first spring provides a restorative force to move the slide door into a closed position covering the socket.

22 Claims, 18 Drawing Sheets

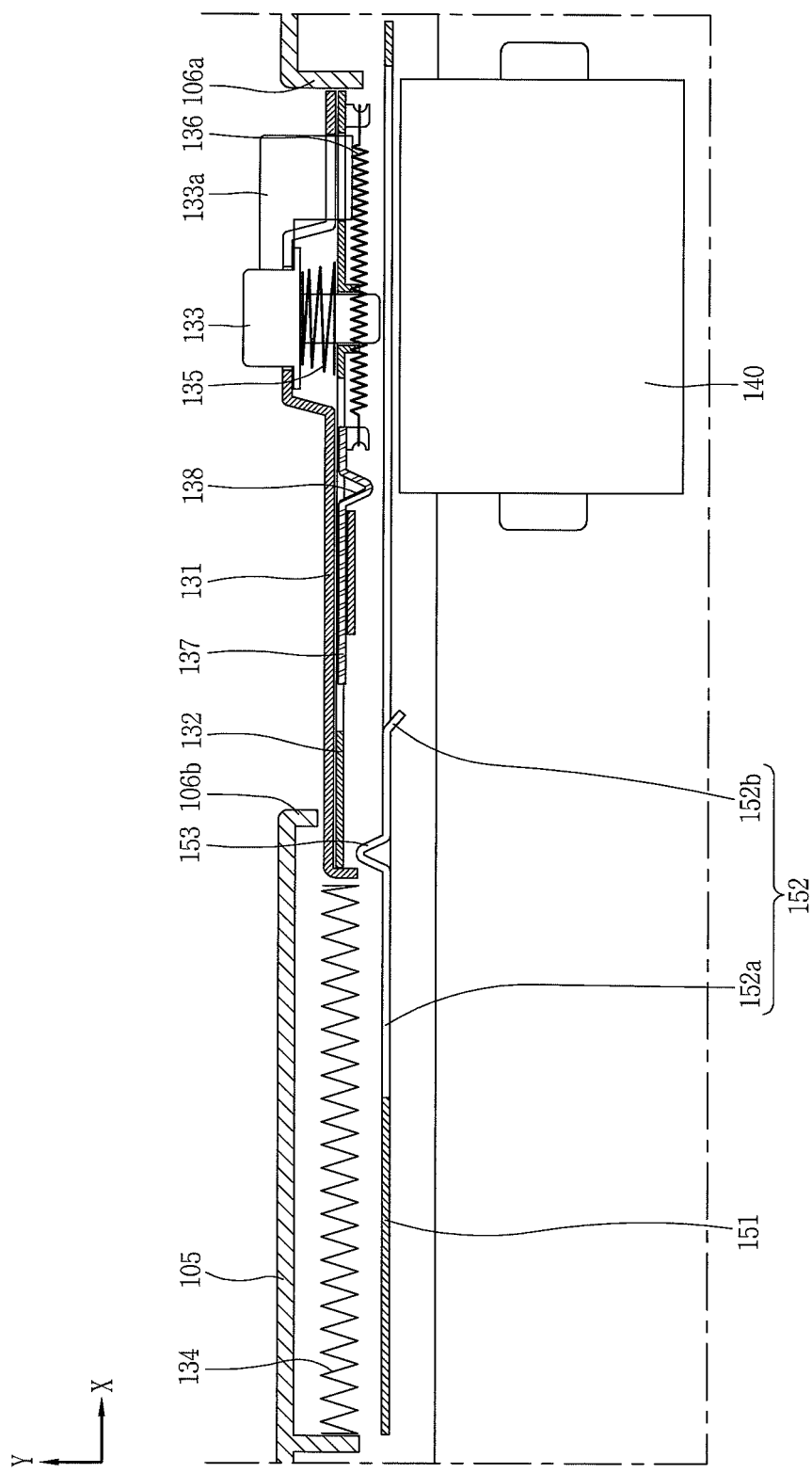

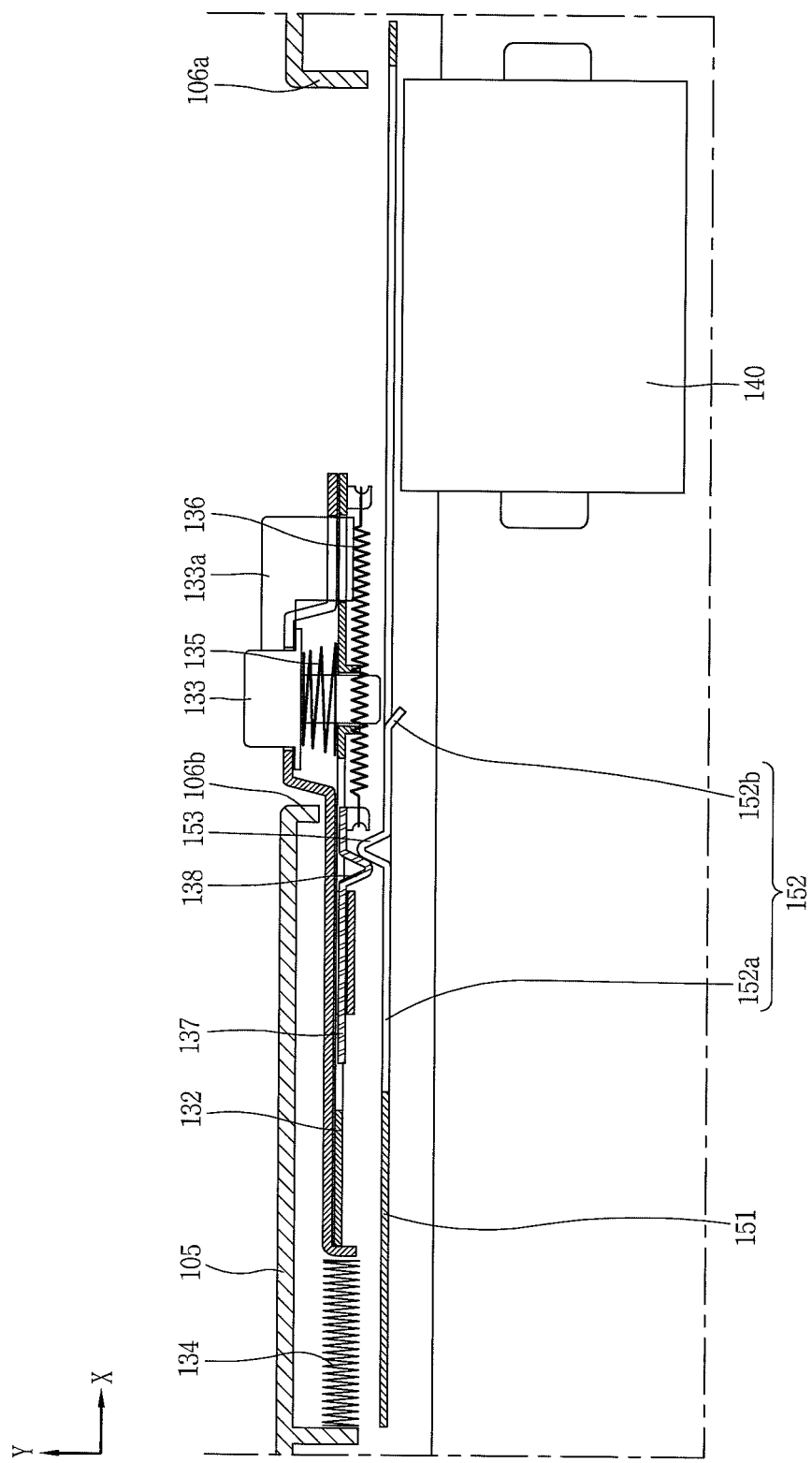

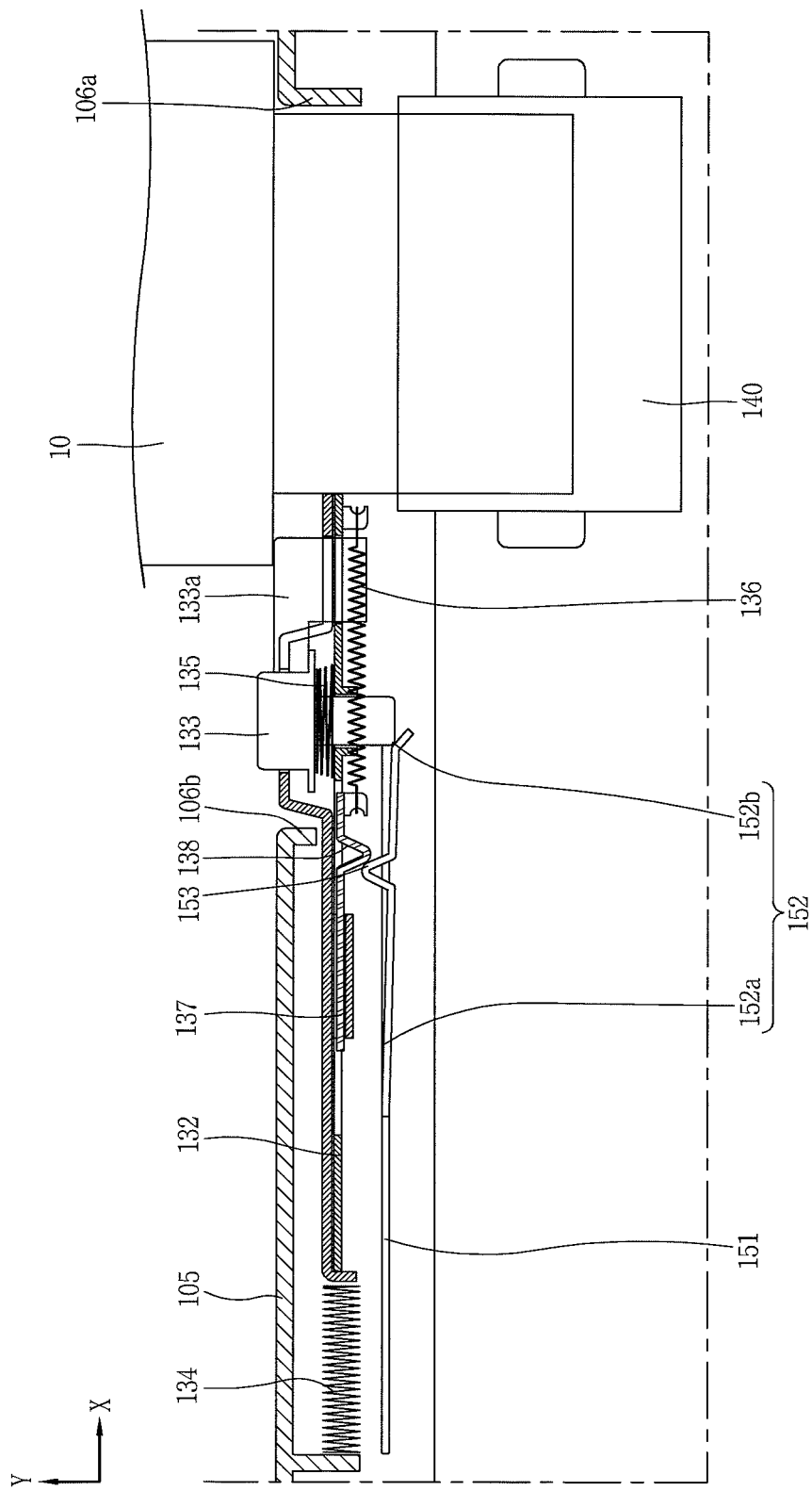

ically described herein, a mobile terminal includes a terminal main body having a socket mounted therein, the socket having an external device connected thereto; a slot portion formed in a case forming the exterior appearance of the terminal main body so as to communicate with the socket; and a slide door implementing an opened state of the socket, maintained by the external device, in a state in which the external device is connected to the socket, wherein, when the external device is separated from the socket, the slide door is slid and moved along the slot portion by a restoring force of a spring coupled to one side of the slide door so as to cover the socket.

In one exemplary embodiment, the slide door may be coupled to the slot portion so as to implement the closed state in which the slide door covers the socket and the opened state in which the slide door exposes the socket.

In one exemplary embodiment, the mobile terminal may further include a fixing assembly having a hook coupled to the slot portion and coupled to a projection of the slide door in the opened state so as to fix the slide door.

In one exemplary embodiment, the fixing assembly may include a first member coupled to the slot portion; and a second member having one end formed in the shape of a cantilever fixed to the first member, and formed to fix the projection by moving a portion at which the hook is formed in one or the other direction or to release the fixation of the projection.

In one exemplary embodiment, the slide door may further have a pressure switch formed to release the coupling between the hook and the projection by moving the second member in the other direction.

In one exemplary embodiment, the pressure switch may have a pressurizing portion extended from one side thereof so as to contact the external device, so that the coupling between the hook and the projection is released by pressurizing the pressure switch in the state in which the external device is connected to the socket.

In one exemplary embodiment, the slide door may include a door body having a through-hole; and a support frame coupled to a rear of the door body. In the slide door, the pressure switch may be coupled to the door body so as to move through the through-hole.

In one exemplary embodiment, the slide door may further have a spring formed between the support frame and the pressure switch so as to elastically support the pressure switch.

In one exemplary embodiment, the slide door may have a latch portion slid and coupled to the support frame so as to be relatively moved from the support frame, and the projection may be formed opposite to the second member at a rear of the latch portion.

In one exemplary embodiment, the slide door may further have a spring connecting the latch portion and the support frame to each other, and tensed in a state in which the projection is held by the hook.

To achieve these and other advantages and in accordance with the purpose of this specification, as embodied and broadly described herein, a mobile terminal includes a terminal main body having a socket mounted therein, the socket having an external device connected thereto; a slot portion formed in a case forming the exterior appearance of the terminal main body so as to communicate with the socket; a slide door coupled to the slot portion so as to implement closed and opened states of the socket; and a fixing assembly having a hook to which a projection of the slide door is fixed, and a releasing project protruded inside the socket allowing the coupling between the projection and the hook to be released by the external device when the external device is connected to the socket.

In one exemplary embodiment, the fixing assembly may include a first member guiding a slide movement of the slide door; a second member rotatably coupled to the first member, and having the hook formed at one end thereof; and a third member rotatably coupled to the first member, and having the releasing projection formed at one end thereof.

In one exemplary embodiment, when the external device is inserted into the socket, the other end of the second member and the other end of the third member may be connected to each other so that the coupling between the projection and the hook is released by upwardly moving the other end of the second member, connected to the other end of the third member, while the releasing projection is downwardly moving.

In one exemplary embodiment, the mobile terminal may further include a first spring tensed in the opened state, and connecting the slide door and the first member to each other.

In one exemplary embodiment, the first and second members may be connected to each other by a second spring so as to support the coupling between the projection and the hook.

To achieve these and other advantages and in accordance with the purpose of this specification, as embodied and broadly described herein, a mobile terminal includes a case forming the exterior appearance of a terminal main body, and having a slot portion formed at any one side thereof; a socket mounted in the terminal main body, and communicating with the slot portion so as to be connected to an external device; a slide door coupled to the slot portion so as to implement closed and opened states of the socket; and a fixing assembly coupled to the slot portion, and to which the slide door is coupled so as to support the opened state, wherein, when the external device is connected to the external device, the coupling between the slide door and the fixing assembly is released.

In one exemplary embodiment, when the coupling between the slide door and the fixing assembly is released, the external device passing through the slot portion may support the opened state while contacting a side of the slide door.

In one exemplary embodiment, the fixing assembly may have a hook coupled to a projection of the slide door so as to fix the slide door.

In the mobile terminal according to the exemplary embodiments configured as described above, the opening/closing structure of a socket can be implemented in a narrower space.

Further, the semi-automatic opening/closing structure of a socket can be implemented. Furthermore, a slide door can be fixed in a state in which a slot is opened or closed in a user's operation.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings:

FIGS. 7A to 7F are conceptual views illustrating an operation of the slide door moving along a slot portion according to the first exemplary embodiment;

DETAILED DESCRIPTION OF THE INVENTION

Hereinafter, a vibration motor and a mobile terminal having the same according to the present disclosure will be explained in more detail with reference to the attached drawings. The suffixes "module" and "unit or portion" for components used in the following description merely provided only for facilitation of preparing this specification, and thus they are not granted a specific meaning or function. For the sake of brief description with reference to the drawings, the same or equivalent components will be provided with the same reference numbers, and description thereof will not be repeated. Singular expressions include plural expressions which do not have any obviously different meaning in view of a context.

The mobile terminal according to the present disclosure may include a portable phone, a smart phone, a laptop computer, a digital broadcasting terminal, Personal Digital Assistants (PDA), Portable Multimedia Player (PMP), a navigation system, etc. However, it will be obvious to those skilled in the art that the present invention may be also applicable to a fixed terminal such as a digital TV and a desktop computer.

Figure 1:
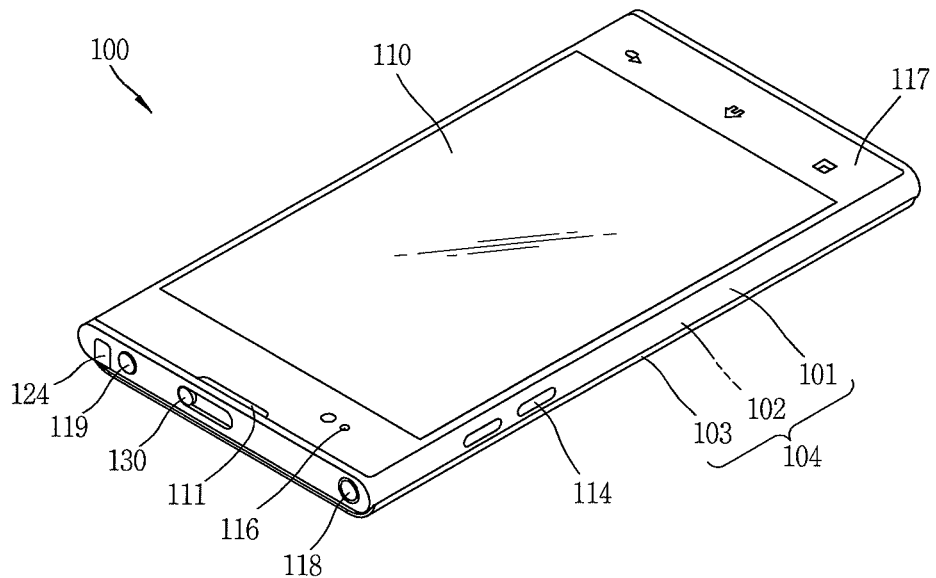
FIG. 1 is a front perspective view of a mobile terminal according to an exemplary embodiment.
Figure 2:
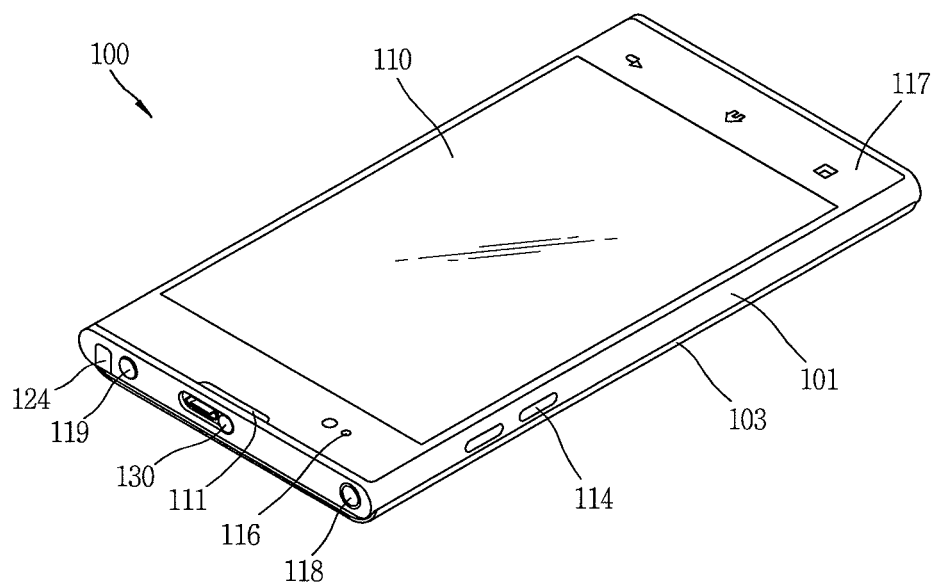
FIG. 2 is a front perspective view showing a state in which a socket is opened in the mobile terminal of FIG. 1.
Figure 3:
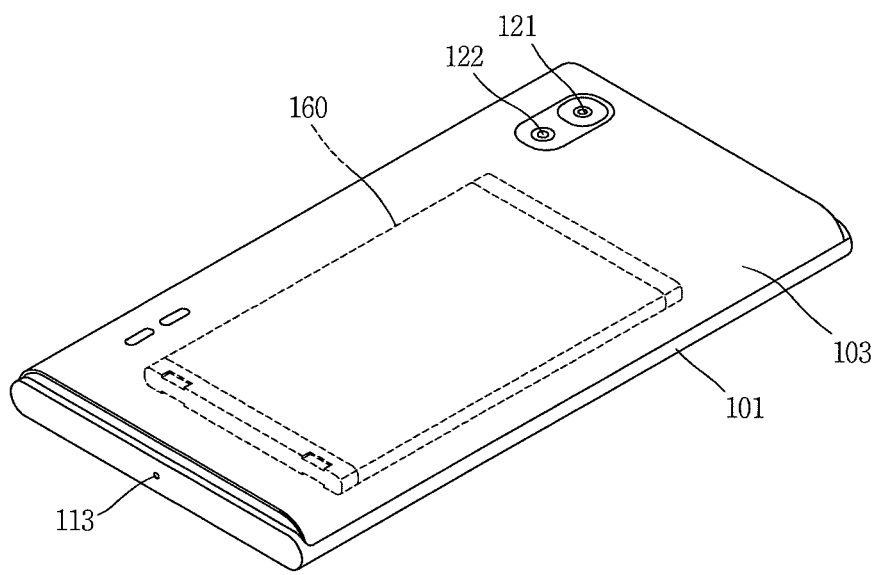
FIG. 3 is a rear perspective view of a mobile terminal according to an exemplary embodiment.

FIG. 1 is a front perspective view of a mobile terminal according to an exemplary embodiment, FIG. 2 is a front perspective view showing a state in which a socket is opened in the mobile terminal of FIG. 1, and FIG. 3 is a rear perspective view of a mobile terminal according to an exemplary embodiment.

Referring to FIGS. 1, 2 and 3, the mobile terminal 100 according to the present invention is a bar type mobile terminal. However, the present invention is not limited to this, but may be applied to a slide type in which two or more bodies are coupled to each other so as to perform a relative motion, a folder type, or a swing type, a swivel type and the like. Further, the mobile terminal of the present invention may be also applicable to any portable electronic device having a camera and a flash, e.g., a portable phone, a smart phone, a notebook computer, a digital broadcasting terminal, Personal Digital Assistants (PDAs), Portable Multimedia Players (PMPs), etc.

The mobile terminal 100 includes a terminal body 104 which forms the appearance of the mobile terminal 100. The terminal body 104 includes a case (casing, housing, cover, etc.) which forms the appearance of the terminal body 104. The case may include a front case 101, a rear case 102 covering an opposite surface to the front case 101, and a battery cover 103 which constitutes the rear surface of the mobile terminal 100 by being coupled to the rear case 102. A space formed by the front case 101 and the rear case 102 may accommodate various components therein. Such cases may be formed by injection-molded synthetic resin, or may be formed using a metallic material such as stainless steel (STS) or titanium (Ti).

On the front surface of the terminal body 104, may be disposed a display 110, a first audio output unit 111, a front camera 116, a side key 114, an interface unit 115 and a user input unit 117.

The display 110 includes a liquid crystal display (LCD) module, organic light emitting diodes (OLED), e-paper, etc., each for visually displaying information. The display 110 may include a touch sensing means for inputting information in a touch manner. Hereinafter, the display 110 including the touch sensing means is called 'touch screen'. Once part on the touch screen 110 is touched, content corresponding to the touched position is input. The content input in a touch manner, may be characters, or numbers, or menu items which can be set in each mode. The touch sensing means may be transmissive so that the display can be viewed, and may include a structure for enhancing visibility of the touch screen at a bright place. Referring to FIG. 1, the touch screen 110 occupies most of the front surface of the front case 101.

The first audio output unit 111 may be implemented as a receiver for transmitting a call sound to a user's ear, or a loud speaker for outputting each type of alarm sound or a playback sound of multimedia.

The front camera 116 processes image frames such as still images or moving images, obtained by an image sensor in a video call mode or a capturing mode. The processed image frames may be displayed on the display 110. The image frames processed by the front camera 116 may be stored in the memory 160, or may be transmitted to the outside through the wireless communication unit 110. The front camera 116 may be implemented in two or more according to a user's interface.

The user input unit 117 is manipulated to receive a command for controlling the operation of the mobile terminal 100, and may include a plurality of input keys. The input keys may be referred to as manipulation portions, and may include any type of ones that can be manipulated in a user's tactile manner. For instance, the user input unit 117 may be implemented as a dome switch, or a touch screen, or a touch pad for inputting commands or information in a user's push or touch manner. Alternatively, the user input unit 117 may be implemented, for example, as a wheel for rotating a key, a jog, or a joystick. The user input unit 117 is configured to input various commands such as START, END and SCROLL.

A side key 114, an interface unit 115, an audio input unit 113, etc. are disposed on the side surface of the front case 101. The side key 114 may be called 'manipulation unit', and may be configured to receive commands for controlling the operation of the mobile terminal 100. The side key 114 may include any type of ones that can be manipulated in a user's tactile manner. Content input by the side key 114 may be variously set. For instance, through the side key 114, may be input commands such as controlling the front and rear cameras 116 and 121, controlling the level of sound output from the audio output unit 111, and converting a current mode of the display 110 into a touch recognition mode.

The audio input unit 113 may be implemented as a microphone for receiving a user's voice, other sound, etc.

The interface unit 115 serves a path through which the mobile terminal 100 performs data exchange, etc. with an external device. For example, the interface unit 115 may be at least one of a connection terminal through which the mobile terminal 100 is connected to an ear phone by cable or radio, a port for local area communication, e.g., an infrared data association (IrDA) port, a Bluetooth portion, a wireless LAN port, and power supply terminals for supplying power to the mobile terminal 100. The interface unit 115 may be a card socket for accommodating an external card such as a subscriber identification module (SIM) card, a user identity module (UIM) card or a memory card for storing information.

A power supply unit 160 and the rear camera 121 are disposed on the rear surface of the terminal body 104. A flash 122 and a mirror (not shown) may be disposed close to the rear camera 121. When capturing an object by using the rear camera 121, the flash 122 provides light onto the object. When the user captures an image of himself/herself by using the rear camera 121, the mirror can be used for the user to look at himself/herself therein.

The rear camera 121 may face a direction which is opposite to a direction faced by the front camera 116, and may have different pixels from those of the front camera 116. For example, the front camera 116 may operate with relatively lower pixels (lower resolution). Thus, the front camera 116 may be useful when a user can capture his face and send it to another party during a video call or the like. On the other hand, the rear camera 121 may operate with a relatively higher pixels (higher resolution) such that it can be useful for a user to obtain higher quality pictures for later use. The front camera 116 and the rear camera 121 may be installed at the terminal body 104 so as to rotate or pop-up.

The power supply unit 160 is configured to supply power to the mobile terminal 100. The power supply unit 160 may be mounted in the terminal body 104, or may be detachably mounted to the terminal body 104.

Figure 4:
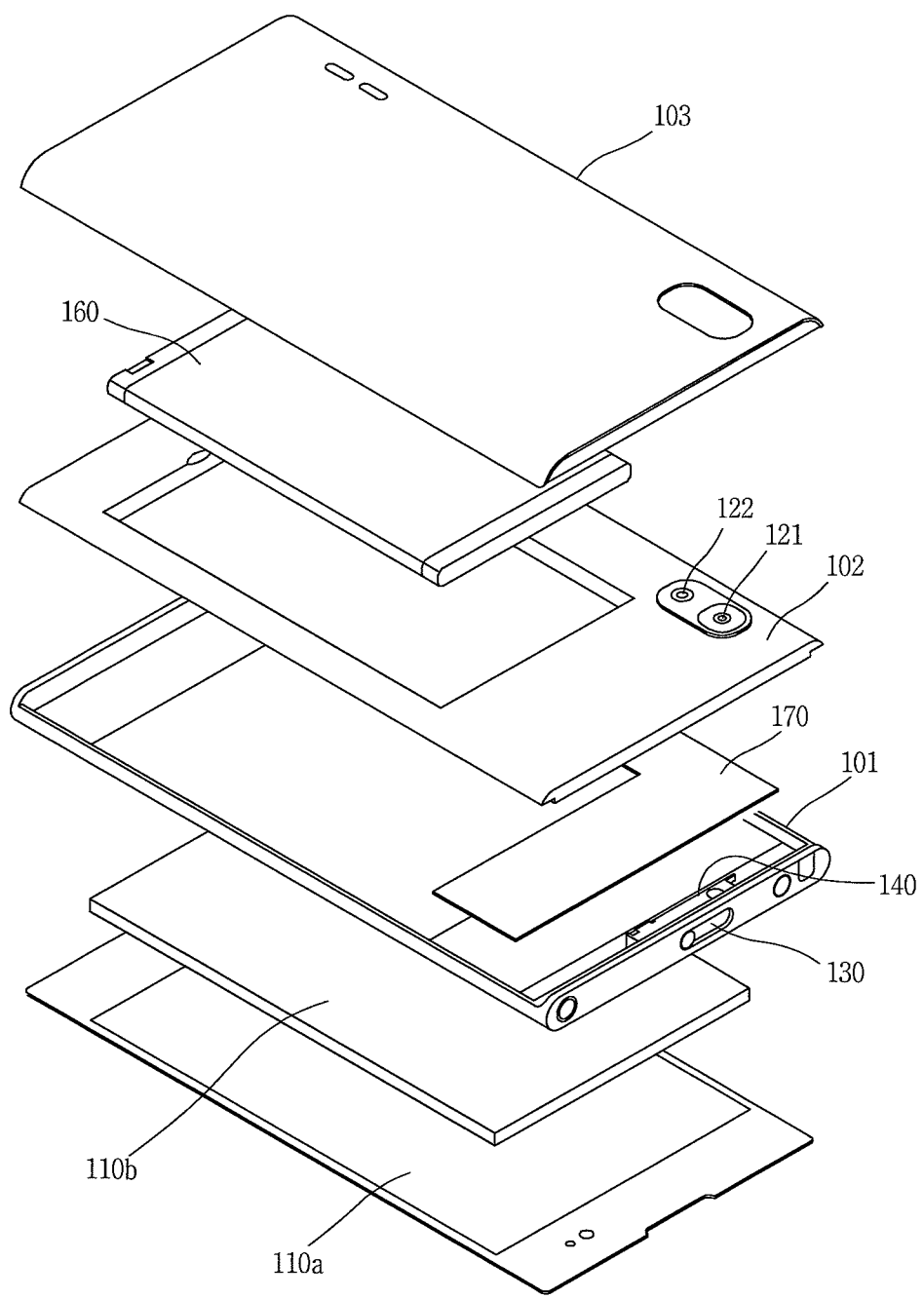
FIG. 4 is an exploded perspective view of the mobile terminal shown in FIG. 3.

FIG. 4 is an exploded perspective view of the mobile terminal shown in FIG. 3. Referring to FIG. 4, a circuit board 170 is disposed in an internal space of the terminal main body 104 formed by the front and rear cases 101 and 102. The circuit board 170 may be mounted to the rear case 102 as shown in this figure, or may be mounted to a separate internal structure. The circuit board 170 may be configured as an example of the controller for operating various kinds of functions of the mobile terminal.

A display 110b electrically connected to the circuit board 170 is disposed on one surface of the circuit board 170. The display 110b may have an area corresponding to the region through which light of a window 110a is transmitted. Accordingly, a user can recognize visual information output on the display 110b from the outside.

A socket 140 electrically connected to the circuit board 170 and formed to be connectable to an external device is disposed in the internal space of the terminal body 104. A slide door 130 is formed to cover the socket 140. An interface device, e.g., a port for charging, earphone or data cable, such as a multimedia interface (MMI) connector may be used as an example of the external device inserted into the socket 140. The interface device may be inserted into the socket 140. A SIM card may be used as another example of the external device. The SIM card refers to a card which can store personal information. In addition, a memory card frequently called as a micro SD, such as a T-flash card, or a modem chip such as a chip mobile state modem (MSM) chip may be inserted into the socket 140.

Referring back to FIG. 1, a pressure manipulation portion 119 is disposed on an upper side surface of the mobile terminal. Here the pressure manipulation portion 119 receives a user's push input to perform any one of the functions previously set in the mobile terminal. A DMB-dedicated receiving antenna 124 may be formed adjacent to the pressure manipulation portion 119 so as to be extractable from the outside of the mobile terminal.

An earphone socket 118 may be disposed at the other side of the upper side surface on which the DMB-dedicated receiving antenna 124 is disposed.

Exemplary Embodiment 1

Figure 5A:
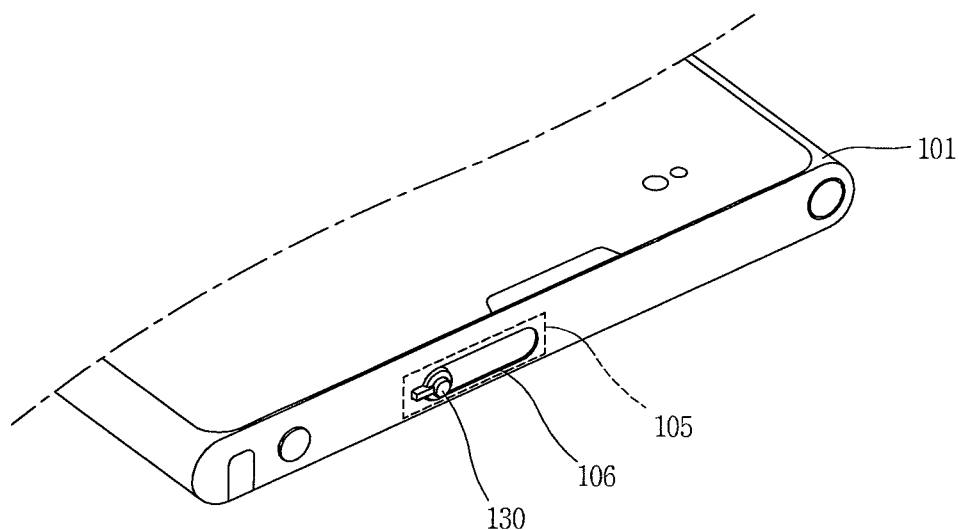
FIGS. 5A to 5C are operational state views of a mobile terminal according to a first exemplary embodiment.
Figure 5B:
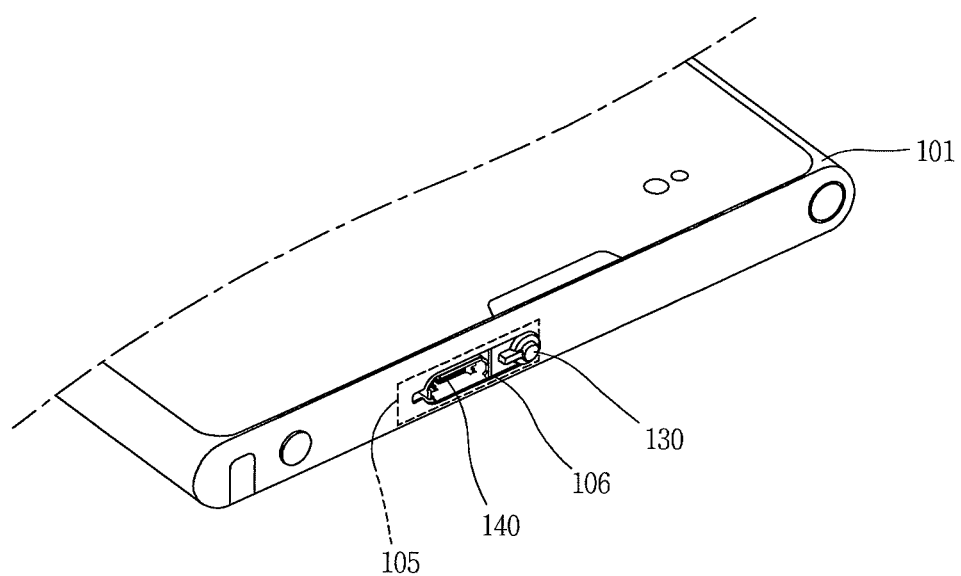
Figure 5C:
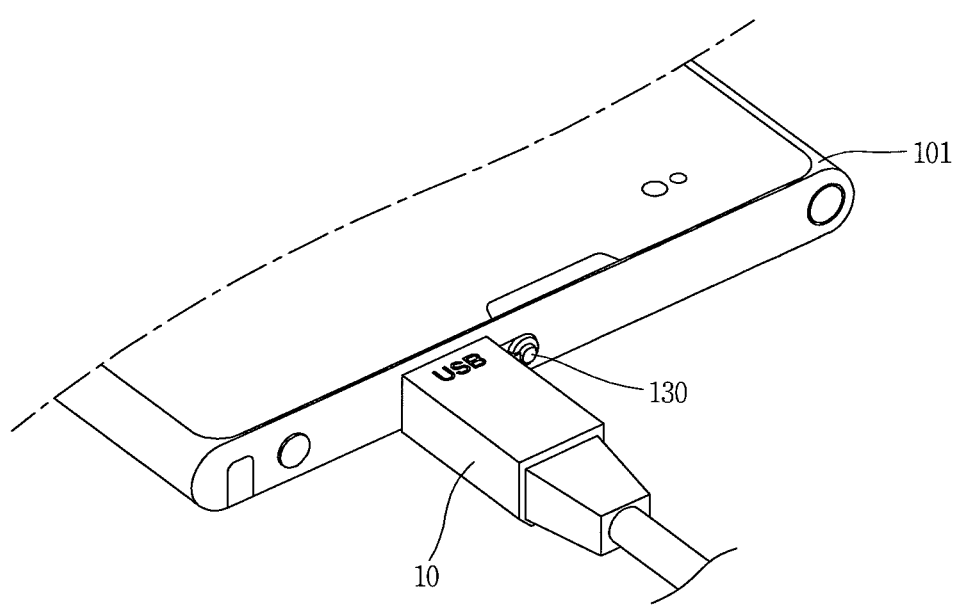

FIGS. 5A to 5C are operational state views of a mobile terminal according to a first exemplary embodiment. FIG. 5A illustrates a closed state in which a slide door 130 covers a socket 140. FIG. 5B illustrates an opened state in which the slide door 130 exposes the socket 140. FIG. 5C illustrates a state in which an external device 10 is connected to the socket 140.

Referring to FIGS. 5A to 5C, the socket 140 is mounted in a terminal main body 104. As shown in FIG. 5C, an interface device as the external device 10 may be connected to the socket 140. In this case, the mobile terminal may communicate electrical signals with the external device 10 or may be charged by the connection between the socket 140 and the interface device. The interface device may be inserted into the socket 140, or a terminal of the socket 140 may be inserted into the interface device, according to the shape or kind of the socket 140.

A slot portion 105 is formed at one side of a case 101 forming the exterior appearance of the terminal main body 104. Here, a front case is used as an example of the case 101, but the slot portion 105 may be formed in a battery case or rear case. The slot portion 105 may include a slot 106 formed so that the external device 10 can pass through the slot portion 105.

In order to prevent external foreign matters from coming into the socket 140, the slide door 130 maintains the closed state to cover the socket 140 in normal times as shown in FIG. 5A. In a case where a user desired to connect the external device 10 to the socket 140, the user pushes the slide door 130 toward one side of the slot portion 105, thereby exposing the socket 140 as shown in FIG. 5B. After the socket 140 is exposed, the external device 10 is connected to the socket 140 by passing through the slot portion 105 as shown in FIG. 5C.

In the exemplary embodiment, there is provided a structure in which when the external device 10 is separated from the socket 140, the slide door 130 semi-automatically covers the socket 140. As shown in FIG. 5C, the opened state of the slide door 130 is maintained in the state in which the external device 10 is connected to the socket 140. However, if the external device 10 is separated from the socket 140, the slide door 130 implements the closed state in which the slide door 130 covers the socket 140 while automatically moving to the other side of the slot portion 105. That is, in the state in which the external device 10 and the socket 140 are separated from each other, the slide door 130 returns to the state in which the slide door 130 is automatically closed.

The slide door 130 may be automatically returned to the closed state by the restoring force of a spring 134. For example, elastic energy is stored in the spring 134 coupled to the slide door 130 in the opened state of the slide door 130, and the movement of the slide door 130 is restricted by the external device 10 in the state in which the external device 10 is connected to the socket 140. If the external device 10 and the socket 140 are separated from each other, the restriction of the movement of the slide door 130 is released, and the slide door 130 implements the closed state in which the slide door 130 automatically covers the socket 140 due to the restoring force of the spring 134.

Hereinafter, a device for restricting the movement of the slide door 130 and the structure of the mobile terminal according to the first exemplary embodiment, in which the closed state can be maintained by semi-automatically covering the socket 140, will be described in detail with reference to the accompanying drawings.

Figure 6:
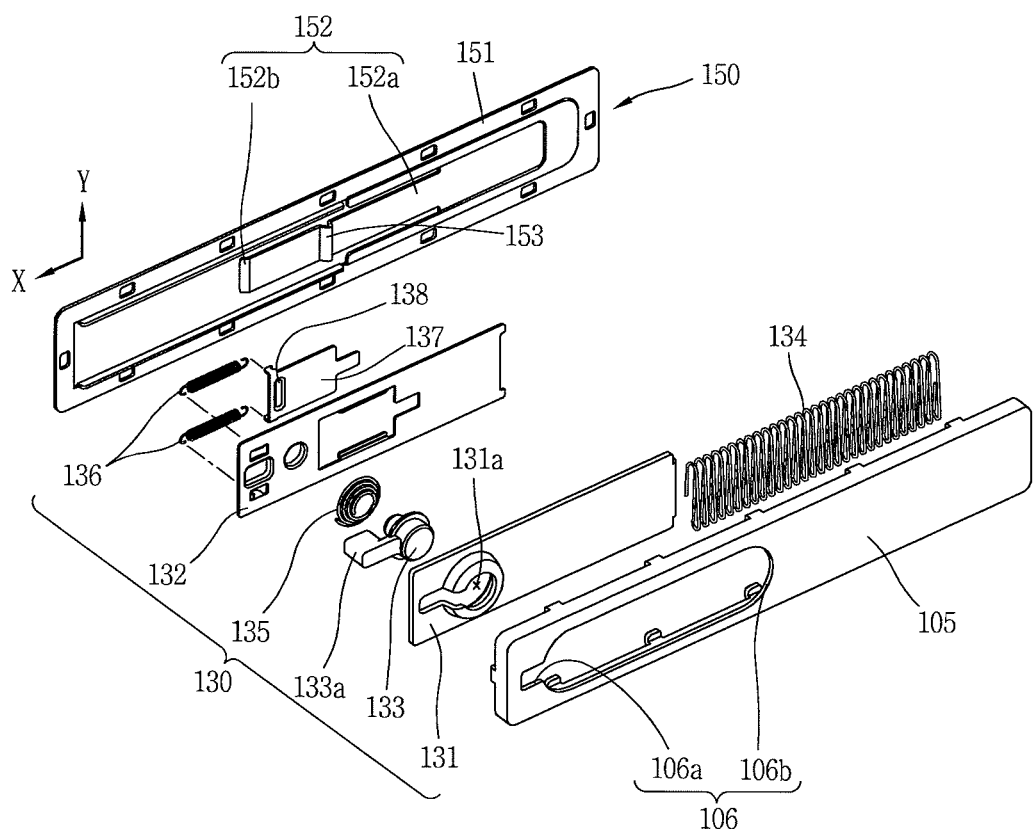
FIG. 6 is an exploded perspective view of a slide door and a fixing assembly according to the first exemplary embodiment.

FIG. 6 is an exploded perspective view of the slide door 130 and a fixing assembly 150 according to the first exemplary embodiment. FIGS. 7A to 7F are conceptual views illustrating an operation of the slide door 130 moving along the slot portion 105 according to the first exemplary embodiment.

Hereinafter, for convenience of illustration, the moving direction of the slide door 130 will be divided into an X-axis positive direction and an X-axis negative direction, and the direction in which a hook 153 of a second member described later vertically moves to be coupled to or released from a projection 138 of the slide door 130 will be divided into a Y-axis positive direction and a Y-direction negative direction.

The slide door 130 and the fixing assembly 150 are coupled to the slot portion 105. The slide door 130 is coupled to the slot portion 105 so as to slide and move in the X-axis positive direction or X-axis negative direction. For example, the slot portion 105 may have a guide surrounding both sides of the slide door 130 so as to guide the movement of the slide door 130.

In a case where the slide door 130 contacts one side 106a of the slot 106 by moving in the X-axis positive direction, the slide door 130 may implement the closed state of the socket 140. In a case where the slide door 130 contacts the other side 106b of the slot 106 by moving in the X-axis negative direction, the slide door 130 may implement the opened state of the socket 140.

The slide door 130 may include a door body 131 and a support frame 132. The door body 131 may have a through-hole 131a, and a pressure switch 133 may be coupled to the through-hole 131a so as to be movable in the Y-axis positive direction or Y-axis negative direction. In this case, a spring 135 is disposed between the support frame 132 and the pressure switch 133. The spring 135 elastically supports the pressure switch 133.

The pressure switch 133 releases fixation caused by the coupling between the projection 138 and the hook 153 by pressurizing a portion of the fixing assembly 150. The pressure switch 133 has a pressurizing portion 133a so that the external device 10 releases the fixation of the hook 153 and the projection 138 by pressurizing the pressure switch 133 in the state in which the external device 10 is connected to the socket 140. The pressurizing portion 133a is extended from one side of the pressure switch 133 so as to contact the external device 10. The pressure switch 133 may be directly pressurized by a user or may be pressurized by the external device 10 so as to release the fixation of the position of the slide door 130 due to the coupling of the projection 138 to the hook 153.

The support frame 132 is coupled to the rear of the door body 131.

The slide door 130 may have the projection 138 coupled to the hook 153 described later. The state in which the hook 153 and the projection 138 are coupled to each other is a state in which the movement of the slide door 130 is restricted. The state in which the coupling between the hook 153 and projection 138 is released is a state in which the restriction of the movement of the slide door 130 is released.

The spring 134 is coupled at one side of the slide door 130. If the spring 134 is compressed in the opened state, and the movement of the slide door 130 is restricted, the elastic energy is stored in the spring 134. If the restriction of the movement of the slide door 130 is released, the slide door 130 is pushed in the X-axis positive direction by the restoring force of the spring 134, so that it is possible to implement the automatically closed state.

The fixing assembly 150 is coupled to the slot portion 105 so as to restrict the movement of the slide door 130 or to release the restriction of the movement of the slide door 130. The fixing assembly 150 may include a first member 151 and a second member 152. The first member 151 may be formed with a thin metal plate coupled to the slot portion 105. One end 152a of the second member 152 may be formed in the shape of a cantilever fixed to the first member 151.

The portion spaced apart from the fixed end 152a of the second member 152 is formed to be movable in the Y-axis positive direction or Y-axis negative direction. The hook 153 for restricting the movement of the slide door 130 or releasing the restriction of the movement of the slide door 130 may be formed at the portion spaced apart from the fixed end 152a of the second member 152. The second member 152 may be made of a metal material, and is formed to be elastically movable in the Y-axis positive direction or Y-axis negative direction. Thus, it is possible to implement the state in which the position of the slide door 130 is fixed due to the coupling of the projection 138 to the hook 153 and the state in which the fixation of the position of the slide door 130 is released so that the slide door 130 can be moved due to the separation of the hook 153 from the projection 138.

The hook 153 of the fixing assembly 150 may restrict the movement of the slide door 130 in the state in which the hook 153 of the fixing assembly 150 is coupled to the projection 138 of the slide door 130, and may release the restriction of the movement of the slide door 130 in the state in which the coupling between the projection 138 of the slide door 130 and the hook 153 of the fixing assembly 150 is released.

According to an additional exemplary embodiment, the slide door 130 may further include a latch portion 137 slid and coupled to the support frame 132 so as to be relatively moved from the support frame 132. The latch portion 137 moves in the X-axis positive direction or X-axis negative direction. The projection 138 may be formed on the rear surface of the latch portion 137 so as to be opposite to the second member 152 of the fixing assembly 150. In this case, the latch portion 137 and the support frame 132 may be connected to each other by a spring 136.

When the coupling between the projection 138 and the hook 153 is released by moving back the second member 152 having the projection 138 formed thereon, the latch portion 137 is relatively moved from the support frame 132, so that the coupling between the projection 138 and the hook 153 can be more easily released.

Figure 7C:
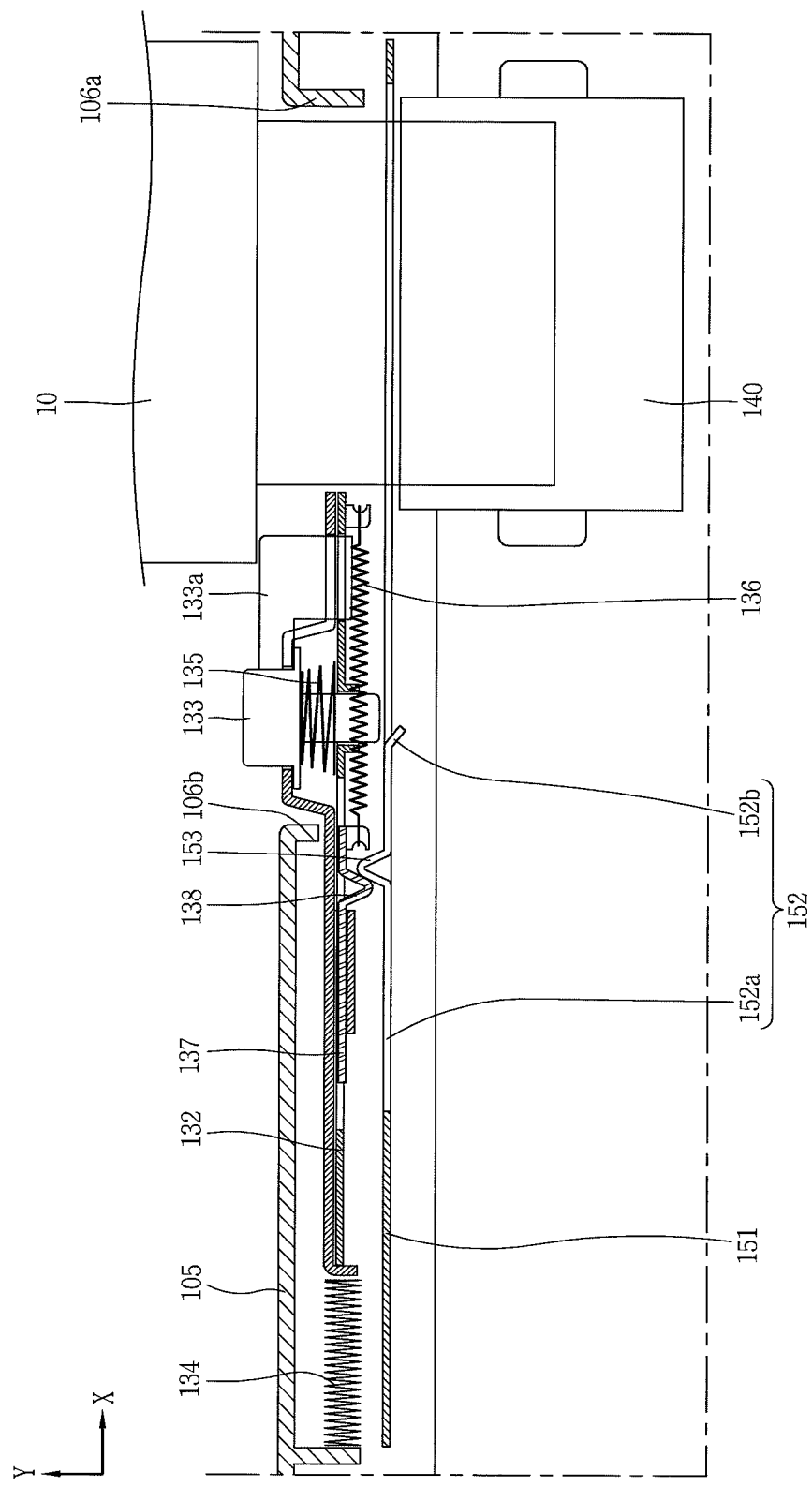

Hereinafter, operations of the components according to the exemplary embodiment will be described in detail with reference to FIGS. 7A to 7F. FIG. 7A illustrates the closed state in which the slide door 130 covers the socket 140. The slide door 130 maintains the closed state while being elastically supported by the spring 134 positioned at the side thereof. FIG. 7B illustrates the opened state in which the slide door 130 exposes the socket 140. If a user pushes the slide door 130 to one side (in the X-axis negative direction, the projection 138 of the slide door 130 jumps over the hook 153 of the fixing assembly 150. That is, the projection 138 is positioned in the X-axis positive direction, based on the hook 153, and then positioned in the X-axis negative direction in the opened state. Thus, the slide door 130 is fixed by the hook 153.

In this case, the force of the fixing assembly 150 supporting the hook 153 is greater than the restoring force of the spring 134 pushing the slide door 130 in the X-axis positive direction, and hence the slide door 130 maintains the opened state.

If the fixing assembly 150 is configured with the first and second members 151 and 152, the hook 153 is formed at the second member 152. The second member 152 is formed in the shape of a cantilever having a fixed end 152a and a free end 152b as described above. The portion spaced apart from the fixed end 152a of the second member 152 is formed to be movable in the Y-axis positive direction or Y-axis negative direction.

As described above, according to the additional exemplary embodiment, the projection 138 of the slide door 130 may be formed at the latch portion 137. The latch portion 137 is formed to relatively move with respect to the slide door 130. In the opened state, the latch portion 137 is moved at a predetermined interval in the X-axis negative direction, based on the original position. Since the latch portion 137 and the slide door 130 are connected to each other by the spring 136, the length of the spring 136 increases, so that the restoring force of the spring 136 is applied to the latch portion 137. That is, the spring 136 pulls the latch portion 137 in the X-axis positive direction. However, since the force of the fixing assembly 150 supporting the hook 153 is greater than the restoring force of the spring 136, the hook 153 and the projection 138 are coupled to each other, thereby maintaining the opened state.

FIGS. 7C and 7D illustrate states before and after the coupling between the hook 153 and the projection 138 is released as the external device 10 pressurizes the pressure switch 133 in the state in which the external device 10 is connected to the socket 140. The external device 10 presses the pressurizing portion 133a of the pressure switch 133 in the state in which the external device 10 is connected to the socket 140. The pressure switch 133 integrally formed with the pressurizing portion 133a pushes the second member 152 disposed at the lower end thereof in the Y-axis negative direction. Thus, the coupling between the projection 138 and the hook 153 is released by moving back the hook 153 formed at the second member 152 in the Y-axis negative direction. Accordingly, the fixed state of the projection 138 maintaining the opened state of the slide door 130 is released. Then, the slide door 130 is moved in the X-axis positive direction by the restoring force of the spring 134, and the movement of the slide door 130 is restricted while contacting the external device 10. In this case, the opened state of the slide door 130 is maintained by the external device 10.

According to the additional exemplary embodiment in which the projection 138 of the slide door 130 is formed at the latch portion 137, when the coupling between the projection 138 and the hook 153 is released as the pressure switch 133 pushes the second member 152 in the Y-axis negative direction, the latch portion 137 is moved in the X-axis positive direction by the restoring force of the spring 136 coupled at one end thereof. In the aforementioned embodiment, the coupling between the projection 138 and the hook 153 can be released only when the second member 152 is moved back at a predetermined distance or more. However, according to the additional exemplary embodiment, although the second member 152 is moved back at a distance smaller than the predetermined distance, the coupling between the projection 138 and the hook 153 can be released. That is, the force applied to the projection 138 is added to release the coupling between the projection 138 and the hook 153, and thus the coupling between the projection 138 and the hook 153 can be quickly released by a smaller force.

Figure 7E:
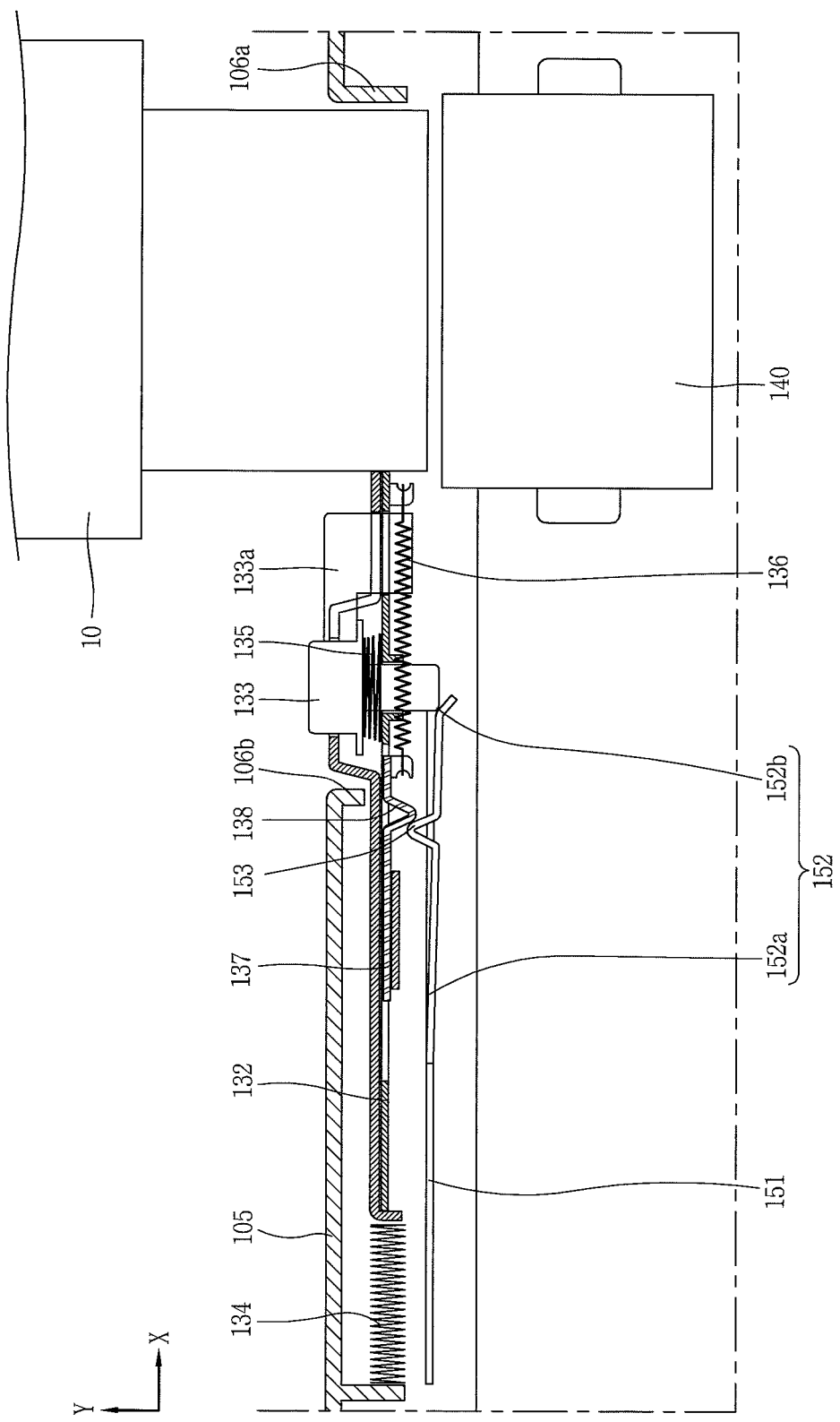
Figure 7F:
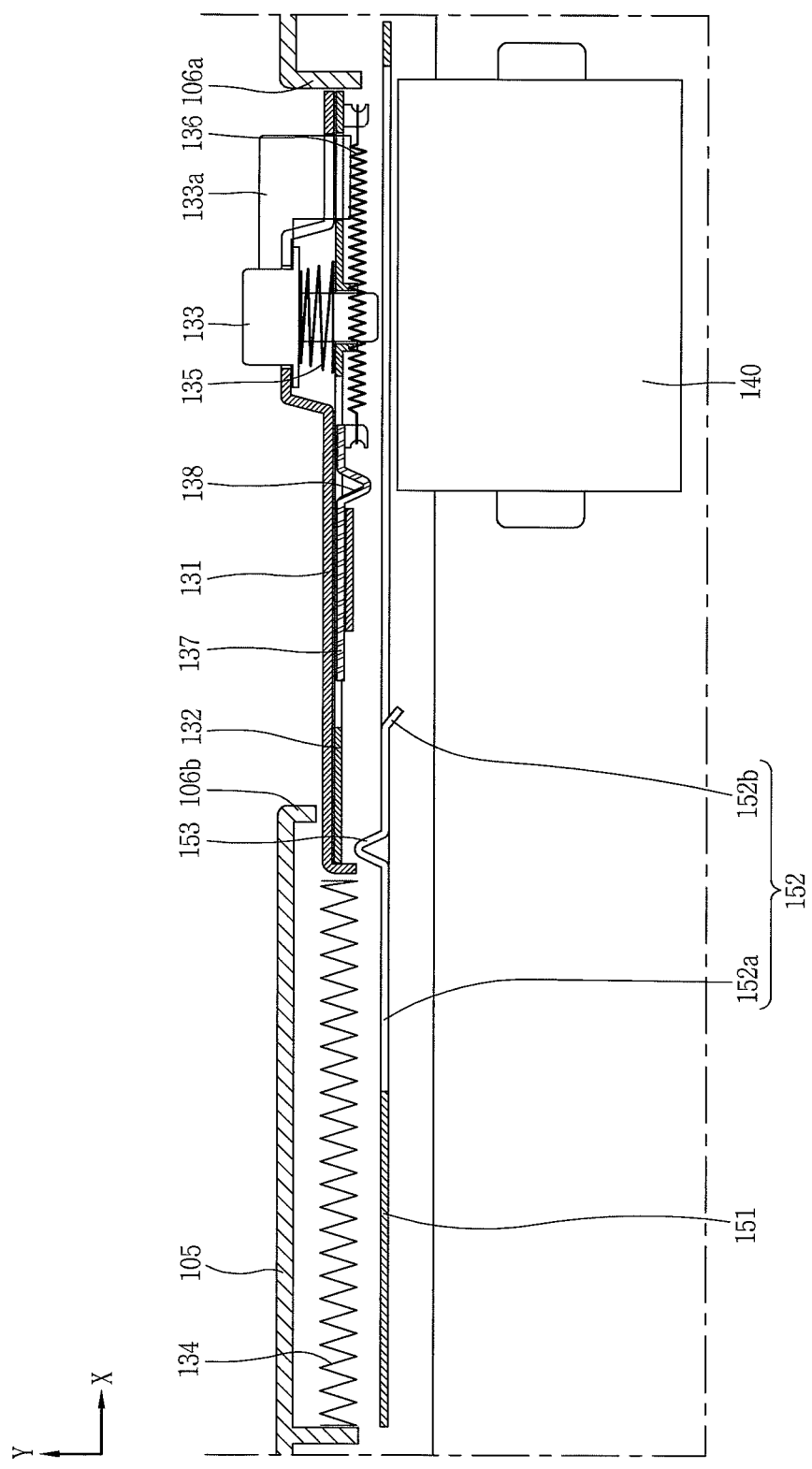

FIGS. 7E and 7F illustrate the closed state implemented as the slide door 130 automatically moves when the external device 10 is separated from the socket 140. As the fixed state of the projection 138 maintaining the opened state of the slide door 130 is released, the opened state of the slide door 130 is maintained by the external device 10. However, if the external device 10 is separated from the socket 140, the slide door 130 is moved in the X-axis positive direction by the restoring force of the spring 134. That is, it is possible to implement the closed state in which the slide door 130 automatically covers the socket 140.

As described above, the mechanism restricting the movement of the slide door 130 can be implemented by the coupling between the projection 138 and the hook 153. Further, as the external device 10 is separated from the socket 140, the slide door 130 is moved by the restoring force of the spring 134, so that it is possible to implement the mechanism allowing the slide door 130 to semi-automatically cover the socket 140.

Exemplary Embodiment 2

Figure 8A:
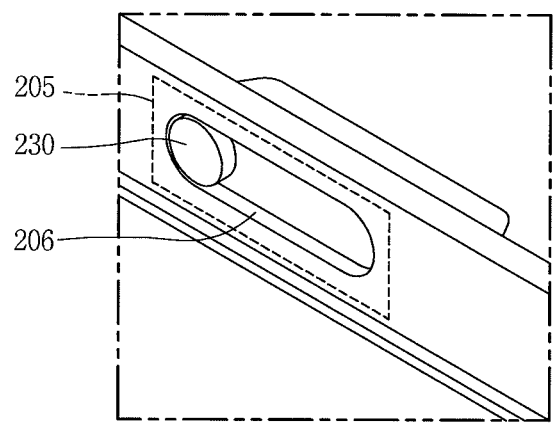
FIGS. 8A to 8C are operational state views of a mobile terminal according to a second exemplary embodiment.
Figure 8B:
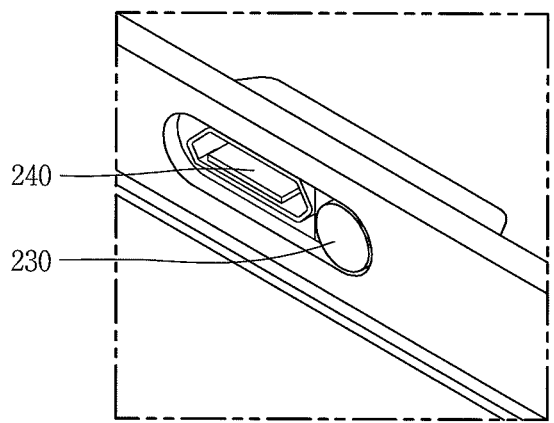
Figure 8C:
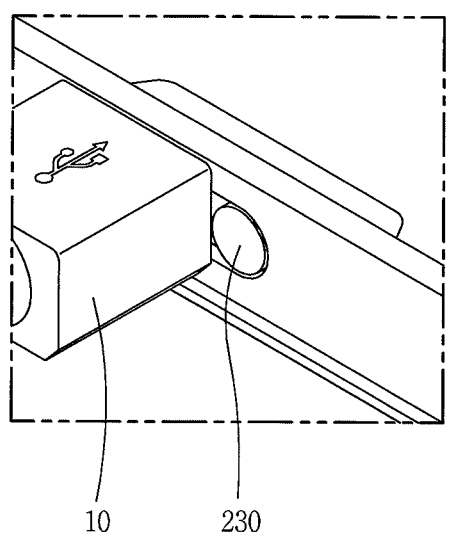

FIGS. 8A to 8C are operational state views of a mobile terminal according to a second exemplary embodiment. Referring to FIGS. 8A to 8C, the socket 240 is mounted in a terminal main body. As shown in FIG. 8C, an interface device as the external device 10 may be connected to the socket 240. In this case, the mobile terminal may communicate electrical signals with the external device 10 or may be charged by the connection between the socket 240 and the interface device. The interface device may be inserted into the socket 240, or a terminal of the socket 240 may be inserted into the interface device, according to the shape or kind of the socket 240.

A slot portion 205 is formed at one side of a case forming the exterior appearance of the terminal main body. The slot portion 205 may include a slot 206 formed so that the external device 10 can pass through the slot portion 205. In order to prevent external foreign matters from coming into the socket 240, the slide door 230 maintains the closed state to cover the socket 240 in normal times as shown in FIG. 8A. In a case where a user desired to connect the external device 10 to the socket 240, the user pushes the slide door 230 toward one side of the slot portion 205, thereby exposing the socket 240 as shown in FIG. 8B. After the socket 240 is exposed, the external device 10 is connected to the socket 240 by passing through the slot portion 205 as shown in FIG. 8C.

In the exemplary embodiment, there is provided a structure in which when the external device 10 is separated from the socket 240, the slide door 230 semi-automatically covers the socket 240. As shown in FIG. 8C, the opened state of the slide door 230 is maintained in the state in which the external device 10 is connected to the socket 240. However, if the external device 10 is separated from the socket 240, the slide door 230 implements the closed state in which the slide door 230 covers the socket 240 while automatically moving to the other side of the slot portion 205. That is, in the state in which the external device 10 and the socket 240 are separated from each other, the slide door 230 returns to the state in which the slide door 230 is automatically closed.

The slide door 230 may be automatically returned to the closed state by the restoring force of a spring. For example, elastic energy is stored in the spring coupled to the slide door 230 in the opened state of the slide door 230, and the movement of the slide door 230 is restricted by the external device 10 in the state in which the external device 10 is connected to the socket 240. If the external device 10 and the socket 240 are separated from each other, the restriction of the movement of the slide door 230 is released, and the slide door 230 implements the closed state in which the slide door 230 automatically covers the socket 240 due to the restoring force of the spring.

Hereinafter, a device for restricting the movement of the slide door 230 and the structure of the mobile terminal according to the second exemplary embodiment, in which the closed state can be maintained by semi-automatically covering the socket 240, will be described in detail with reference to the accompanying drawings.

Figure 9:
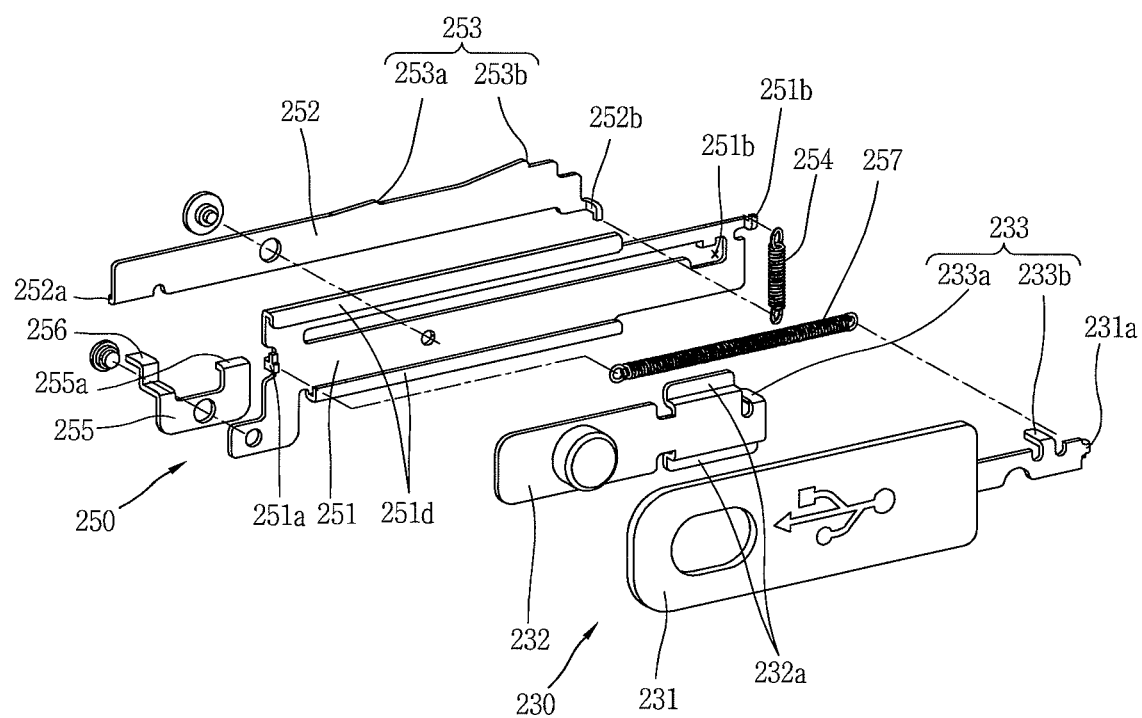
FIG. 9 is an exploded perspective view of a slide door and a fixing assembly according to the second exemplary embodiment.

FIG. 9 is an exploded perspective view of the slide door 230 and a fixing assembly 250 according to the second exemplary embodiment. FIGS. 10A to 10D are conceptual views illustrating an operation of the slide door 230 moving along the slot portion 205 according to the second exemplary embodiment.

Hereinafter, for convenience of illustration, the moving direction of the slide door 230 will be divided into an X-axis positive direction and an X-axis negative direction, and the direction in which a hook 253 of a second member 252 described later vertically moves to be coupled to or released from a projection 233 of the slide door 230 will be divided into a Y-axis positive direction and a Y-direction negative direction.

The slide door 230 and the fixing assembly 250 are coupled to the slot portion 205. The slide door 230 is coupled to the slot portion 205 so as to slide and move in the X-axis positive direction or X-axis negative direction.

The fixing assembly 250 includes first, second and third members 251, 252 and 255. The first member 251 includes a slit 251b into which the projection 233 of the slide door 230 is inserted to guide the movement of the slide door 230. One end 231a of a first door 231 and a connecting portion 251a of the first member 251 are connected by a spring 257.

The second member 252 is rotatably coupled to the first member 251. The hook 253 formed to hold the projection 233 in the state in which the slide door 230 moves to a predetermined position is formed on one upper surface biased to any one end 252b of the second member 252. The hook 253 includes first and second hooks 253a and 253b spaced apart from each other.

The third member 255 is rotatably coupled to the first member 251. A releasing projection 256 allowing the coupling between the projection 233 of the slide door 230 and the hook 253 to be released by rotating when the external device 10 is connected to the socket 240 is formed at one end of the third member 255.

The center axes about which the second and third members 252 and 255 are rotated with respect to the first member 251 are formed to be spaced apart from each other.

The hook 253 is formed on the one upper surface biased to the one end 252b of the second member 252. The other end 252a of the second member 252 is formed to contact the third member 255. The releasing projection 256 is formed at the one end of the third member 255, and the other end 255a of the third member 255 is formed to contact the other end 252a of the second member 252. The releasing projection 256 is formed to move in the Y-axis positive direction or Y-axis negative direction by passing through the socket 240 in the rotation of the releasing projection 256.

The slide door 230 includes a first door member 231 and a second door member 232. One end 231a of the first door member 231 is connected to the first member 251 by the spring 257. The spring 257 is tensed in the opened state of the slide door 230 so as to store elastic energy. The second door member 232 is coupled to the first door member 231. The second door member 232 is formed to move along the slit 251b, and has a first projection 232a held by the hook 253. The first door member 231 may have a second projection 231a. Each of the hook 253 and the projection 233 is formed in plural numbers 253a, 253b, 233a and 233b, so that the opened state can be more firmly maintained. The first and second door members 231 and 232 may be integrally formed.

Figure 10A:
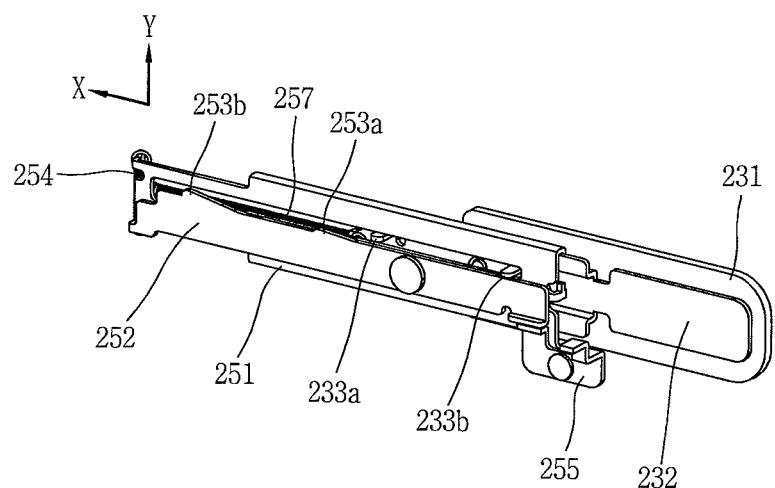
FIGS. 10A to 10D are conceptual views illustrating an operation of the slide door moving along a slot portion according to the second exemplary embodiment.
Figure 10B:
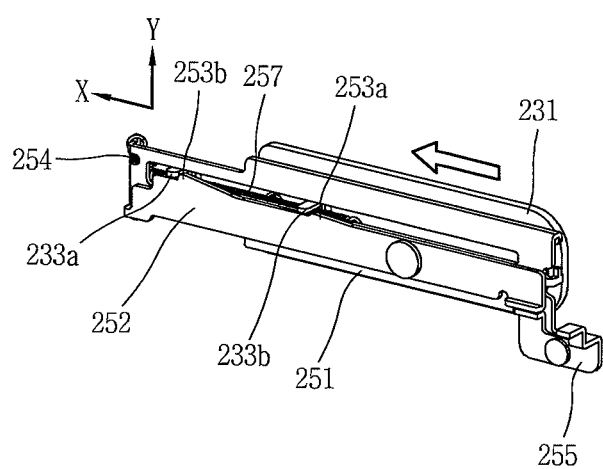

FIGS. 10A and 10B respectively illustrate the closed state and opened state of the slide door 230 coupled to the fixing assembly 250. The closed state and opened state, as described above, refer to a state in which the slide door 230 covers the socket 240 and a state in which the slide door 230 exposes the socket 240, respectively.

As shown in FIG. 10A, in the closed state, the projection 233 of the slide door 230 is disposed in a state in which the projection 233 is held by the slit 251b of the first member 251. If a user pushes the slide door 230 to one side (in the X-axis positive direction), the projection 233 of the slide door 230 moves along the slit 251b of the fixing assembly 250. If the projection 233 is moved to a predetermined position, the projection 233 is moved to the inside while pushing the portion at which the hook 253 of the second member 252 is formed. If the projection 233 is moved while pushing the second member 252, the one end 252b of the second member 252 is moved in the Y-axis negative direction while the second member 252 is rotating. The one end 252b of the second member 252 and the first member 251 are connected to each other by the spring 254, and thus the one end 252b of the second member 252 is again moved in the Y-axis positive direction. Referring to FIG. 10B, as the projection 233 is pushed in the X-axis positive direction, the second member 252 is moved clockwise and then moved counterclockwise by the restoring force of the spring 254 at the position passing the portion at which the hook 253 is formed. In this case, the projection 233 is held by the hook 253, and the opened state can be maintained.

Since the slide door 230 and the first member 251 are connected to each other by the spring 257, the spring 257 is tensed in the opened state so that the restoring force of the spring 257, which allows the slide door 230 to be moved in the X-axis negative direction, is applied to the slide door 230.

Figure 10C:
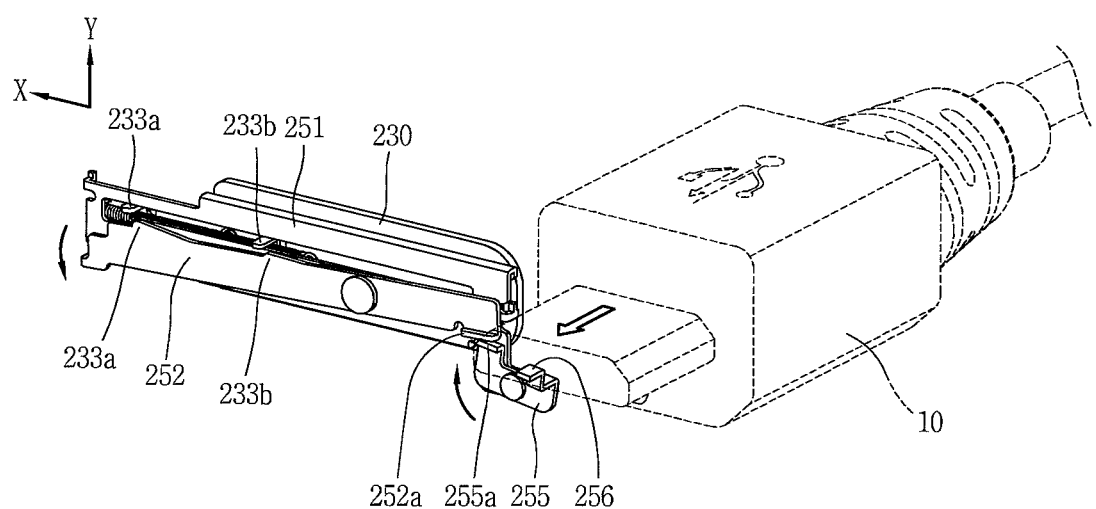

FIG. 10C illustrates that the coupling between the projection 233 and the hook 253 is released in the state in which the external device 10 is connected to the socket 240. The releasing projection 256 of the third member 255 is protruded inside the socket 240. If the external device 10 is inserted into the socket 240, the releasing projection 256 of the third member 255 is pushed in the Y-axis negative direction. Thus, the third member 255 pushes the other end 252a of the second member 252 in the Y-axis positive direction while rotating clockwise. Accordingly, the second member 252 rotates counterclockwise, and the one end 252b of the second member 252, approaching the hook 253, is moved in the Y-axis negative direction, thereby releasing the coupling between the projection 233 and the hook 253.

As the coupling between the projection 233 and the hook 253 is released, the slide door 230 implements the closed state by moving in the X-axis negative direction. However, the opened state of the slide door 230 is maintained by the external device 10 inserted into the socket 240. That is, the slide door 230 maintains the opened state while contacting the side of the external device 10.

Figure 10D:
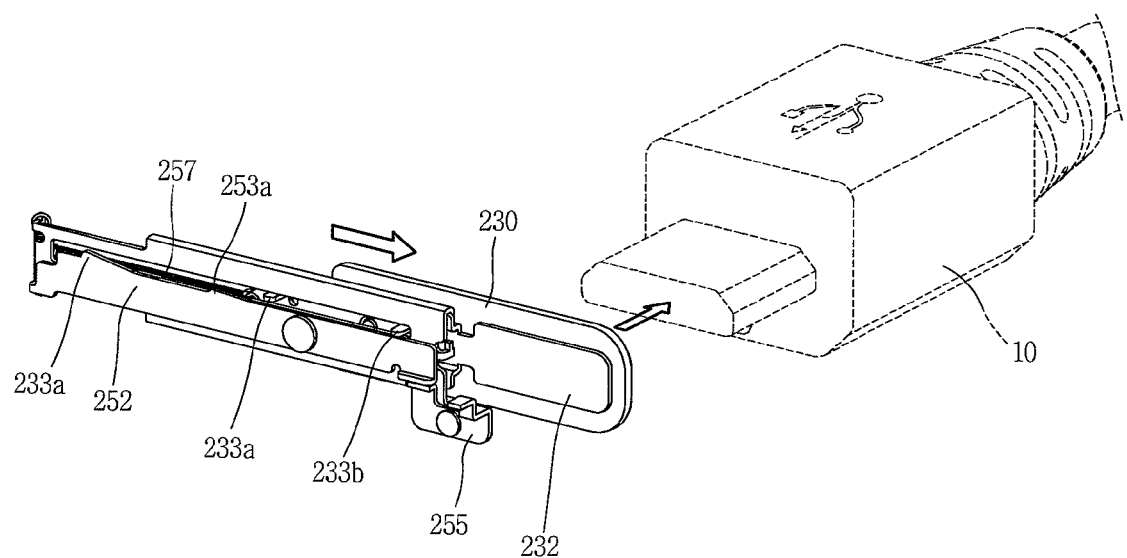

FIG. 10D illustrates the state in which the external device 10 is separated from the socket 240. If the external device 10 is separated from the socket 240, the slide door 230 moves in the X-axis negative direction, so that the closed state is maintained as shown in FIG. 10A.

According to the configuration described above, it is possible to implement the closed state in which the slide door 230 automatically covers the socket 240 when the external device 10 is separated from the socket 240.

As described above, the mechanism restricting the movement of the slide door 230 can be implemented by the coupling between the projection 238 and the hook 253. Further, as the external device 10 is separated from the socket 240, the slide door 230 is moved by the restoring force of the spring 257, so that it is possible to implement the mechanism allowing the slide door 230 to semi-automatically cover the socket 240.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a terminal body, the terminal body having a case that forms an exterior of the terminal body and a slot portion formed in the case;
   a socket mounted in the terminal body, the socket being configured to receive an external device through the slot portion;
   a fixing assembly having a hook, the fixing assembly being coupled to the slot portion;
   a slide door located at the slot portion, the slide door being configured to slide to expose and cover the socket; and
   a first spring coupled to one side of the slide door,
   wherein, when the external device is connected to the socket, the external device maintains the slide door in an open position,
   wherein, when the external device is removed from the socket, the first spring provides a restorative force to move the slide door into a closed position covering the socket,
   wherein the slide door is coupled to the slot portion, and
   wherein the slide door includes a projection configured to releasably engage the hook of the fixing assembly when the slide door is slid to expose the socket and to releasably fix the slide door in the open position.

2. The mobile terminal of claim 1, wherein the fixing assembly includes:
   a first member coupled to the slot portion; and
   a second member having one end formed in a shape of a cantilever and fixed to the first member, the second member including a portion having the hook,
   wherein the second member is configured to allow displacement of the portion having the hook in a first direction to engage the projection and to allow displacement of the portion having the hook in a second direction to release the projection from engagement with the projection.

3. The mobile terminal of claim 2, wherein the slide door further includes a pressure switch configured to release the engagement between the hook and the projection by moving the second member in the second direction.

4. The mobile terminal of claim 3, wherein the pressure switch includes a pressurizing portion extended from one side thereof, and wherein, when the external device is connected to the socket, the external device contacts the pressuring portion to release the engagement between the hook and the projection.

5. The mobile terminal of claim 3, wherein the slide door includes:
a door body having a through hole; and
a support frame coupled to a rear of the door body,
wherein the pressure switch is coupled to the door body so as to be movable in the through hole.

6. The mobile terminal of claim 5, wherein the slide door further includes a spring formed between the support frame and the pressure switch so as to elastically support the pressure switch.

7. The mobile terminal of claim 5, wherein the slide door further includes a latch portion slidably coupled to the support frame, and
wherein the projection is formed opposite to the second member at a rear of the latch portion.

8. The mobile terminal of claim 7, wherein the slide door further includes a second spring connecting the latch portion to the support frame, the second spring being stretched when the projection engages the hook.

9. A mobile terminal, comprising:
a terminal body, the terminal body having a case that forms an exterior of the terminal body and a slot portion formed in the case;
a socket mounted in the terminal body, the socket being configured to receive an external device through the slot portion;
a slide door located at the slot portion, the slide door being configured to slide to expose and cover the socket, the slide door having a projection; and
a fixing assembly having a hook configured to releasably engage the slide door projection and a releasing projection arranged to extend into the socket, the fixing assembly being configured to disengage the slide door projection from the hook when the external device is inserted into the socket and contacts the releasing projection.

10. The mobile terminal of claim 9, wherein the fixing assembly includes:
a first member guiding a slide movement of the slide door;
a second member rotatably coupled to the first member, the second member having the hook formed at a first end thereof; and
a third member rotatably coupled to the first member, the third member having the releasing projection formed at a first end thereof.

11. The mobile terminal of claim 10, wherein the second member includes a second end spaced from the first end of the second member,
wherein the third member includes a second end spaced from the first end of the third member, and
wherein the second end of the second member is connected to the second end of the third member such that, when the external device is inserted into the socket, the second end of the second member is configured to moved upward when the releasing projection is moved downward, thereby releasing the engagement of the hook and the slide door projection.

12. The mobile terminal of claim 10, further comprising a first spring connecting the slide door to the first member, the first spring being compressed when the slide door is moved to expose the socket.

13. The mobile terminal of claim 12, wherein the first and second members are connected to each other by a second spring so as to support the coupling between the projection and the hook.

14. A mobile terminal, comprising:
a terminal body having a case forming an exterior appearance of the terminal body, the case having a slot portion formed at one side thereof;
a socket mounted in the terminal body, the socket being configured to communicate with the slot portion so as to be connectable to an external device;
a slide door coupled to the slot portion so as to be movable to expose and cover the socket; and
a fixing assembly coupled to the slot portion, the slide door being coupled to the fixing assembly so as to hold the slide door in a first position to expose the socket,
wherein, when the external device is connected to the external device, the coupling between the slide door and the fixing assembly is released,
wherein the slide door includes a projection, and
wherein the fixing assembly includes a hook, the hook being configured to releasably engage to the projection of the slide door so as to hold the door in the first position.

15. The mobile terminal of claim 14, wherein, when the coupling between the slide door and the fixing assembly is released, a portion of the connected external device extending through the slot portion holds the slide door in a second position by contact with a side of the slide door.

16. The mobile terminal of claim 14, wherein the fixing assembly further includes:
a first member coupled to the slot portion; and
a second member having one end formed in a shape of a cantilever and fixed to the first member, the second member including a portion having the hook,
wherein the second member is configured to allow displacement of the portion having the hook in a first direction to engage the projection and to allow displacement of the portion having the hook in a second direction to release the projection from engagement with the projection.

17. The mobile terminal of claim 16, wherein the slide door further includes a pressure switch configured to release the engagement between the hook and the projection by moving the second member in the second direction.

18. The mobile terminal of claim 17, wherein the pressure switch includes a pressurizing portion extended from one side thereof, and
wherein, when the external device is connected to the socket, the external device contacts the pressuring portion to release the engagement between the hook and the projection.

19. The mobile terminal of claim 18, wherein the slide door includes:
a door body having a through hole; and
a support frame coupled to a rear of the door body,
wherein the pressure switch is coupled to the door body so as to be movable in the through hole.

20. The mobile terminal of claim 14,
wherein the fixing assembly includes a releasing projection arranged to extend into the socket, the fixing assembly being configured to disengage the slide door projection from the hook when the external device is inserted into the socket and contacts the releasing projection.

21. The mobile terminal of claim 20, wherein the fixing assembly includes:
a first member guiding a slide movement of the slide door;

a second member rotatably coupled to the first member, the second member having the hook formed at a first end thereof; and a third member rotatably coupled to the first member, the third member having the releasing projection formed at a first end thereof.

22. The mobile terminal of claim 21, wherein the second member includes a second end spaced from the first end of the second member, wherein the third member includes a second end spaced from the first end of the third member, and wherein the second end of the second member is connected to the second end of the third member such that, when the external device is inserted into the socket, the second end of the second member is configured to be moved upward when the releasing projection is moved downward, thereby releasing the engagement of the hook and the slide door projection.

* * * * *